United States Patent [19]

Chang et al.

[11] Patent Number: 5,483,840
[45] Date of Patent: Jan. 16, 1996

[54] SYSTEM FOR MEASURING FLOW

[75] Inventors: Victor Chang, San Antonio; Oscar Chang; Mauricio Campo, both of Caracas, all of Venezuela

[73] Assignee: Intevep, S.A., Caracas, Venezuela

[21] Appl. No.: 341,007

[22] Filed: Nov. 17, 1994

[51] Int. Cl.⁶ .................................................. G01L 1/00
[52] U.S. Cl. ............................. 73/861.71; 73/861.76
[58] Field of Search ........................... 73/861.71, 861.72, 73/861.73, 861.74, 861.75, 861.76

[56] References Cited

U.S. PATENT DOCUMENTS

| | | | |
|---|---|---|---|
| 4,777,830 | 10/1988 | Lew | 73/861.71 |
| 5,123,285 | 6/1992 | Lew | 73/861.22 |
| 5,307,686 | 5/1994 | Norén | 73/861.87 |

Primary Examiner—Richard Chilcot
Assistant Examiner—Jewel V. Artis
Attorney, Agent, or Firm—Bachman & LaPointe

[57] ABSTRACT

A system for measuring a flow parameter of a fluid, comprising a conduit defining a flow passage for said fluid, said flow passage having a central axis means located in said flow passage for measuring a differential between a first resultant drag exerted by said fluid at a first distance from said central axis and a second resultant drag exerted by said fluid at a second distance from said central axis different from said first distance and means for determining said flow parameter from said differential, whereby said flow parameter is accurately measured regardless of viscosity changes in said fluid.

22 Claims, 6 Drawing Sheets

SYSTEM FOR MEASURING FLOW

BACKGROUND OF THE INVENTION

The invention relates to a system for measuring a flow of a fluid, particularly for measuring the flow of a non-Newtonian fluid such as an oil-in-water emulsion.

Conventional flow measurement devices encounter difficulty in measuring the flow of non-Newtonian fluids wherein the viscosity of the fluid changes along with the velocity. This problem is especially prevalent when the fluid is being transported in large diameter pipelines.

Oil-in-water emulsions are frequently used as a means for transporting highly viscous hydrocarbons and the like. The oil-in-water emulsion has a reduced viscosity and is therefore much more readily flowable or pumpable in conventional pipelines and the like. However, oil-in-water emulsions are non-Newtonian in that the viscosity of the emulsion is highly dependent upon the velocity of the flowing emulsion. Changes in viscosity result in changes in the velocity profile across the pipe diameter, and the well known parabolic profile is no longer accurate.

The need exists for a system for accurately measuring flow of fluid even when the fluid is non-Newtonian and therefore has a viscosity which is dependent upon factors such as velocity.

It is therefore the primary object of the present invention to provide a system for measuring flow of a fluid which provides measurements which are not adversely affected by variation of the viscosity of the fluid.

It is a further object of the invention to provide a system for measuring the flow of a non-Newtonian fluid which is simple, accurate and reliable.

Other objects and advantages will appear hereinbelow.

SUMMARY OF THE INVENTION

In accordance with the foregoing, a system for measuring a flow of a fluid is provided which comprises a conduit defining a flow passage for said fluid, said flow passage having a central axis; means located in said flow passage for measuring a differential between a first resultant drag exerted by said fluid at a first distance from said central axis and a second resultant drag exerted by said fluid at a second distance from said central axis different from said first distance; and means for determining said flow parameter from said differential, whereby said flow parameter is accurately measured regardless of viscosity changes in said fluid.

In further accordance with the invention, the means for measuring preferably comprises a substantially uniform disc rotatably positioned within said conduit so that differential force exerted by said flow of fluid causes rotation of said disc.

Positioning of the rotatable disc in the flow profile of the fluid, in accordance with the invention, causes rotation of the disc under kinematic conditions which compensates viscosity shear stress changes on the disc so as to provide accurate measurement of flow regardless of fluctuation in viscosity.

BRIEF DESCRIPTION OF THE DRAWINGS

A detailed description of preferred embodiments of the invention follows, with reference to the attached drawings wherein.

DETAILED DESCRIPTION

The invention relates to a system for measuring a flow of a fluid, particularly a non-Newtonian oil-in-water emulsion, wherein the system is accurate despite fluctuations in viscosity of the fluid to be measured which may be caused by variations in velocity or composition of the fluid. Of course, the system can also measure Newtonian fluids.

Figure 1:
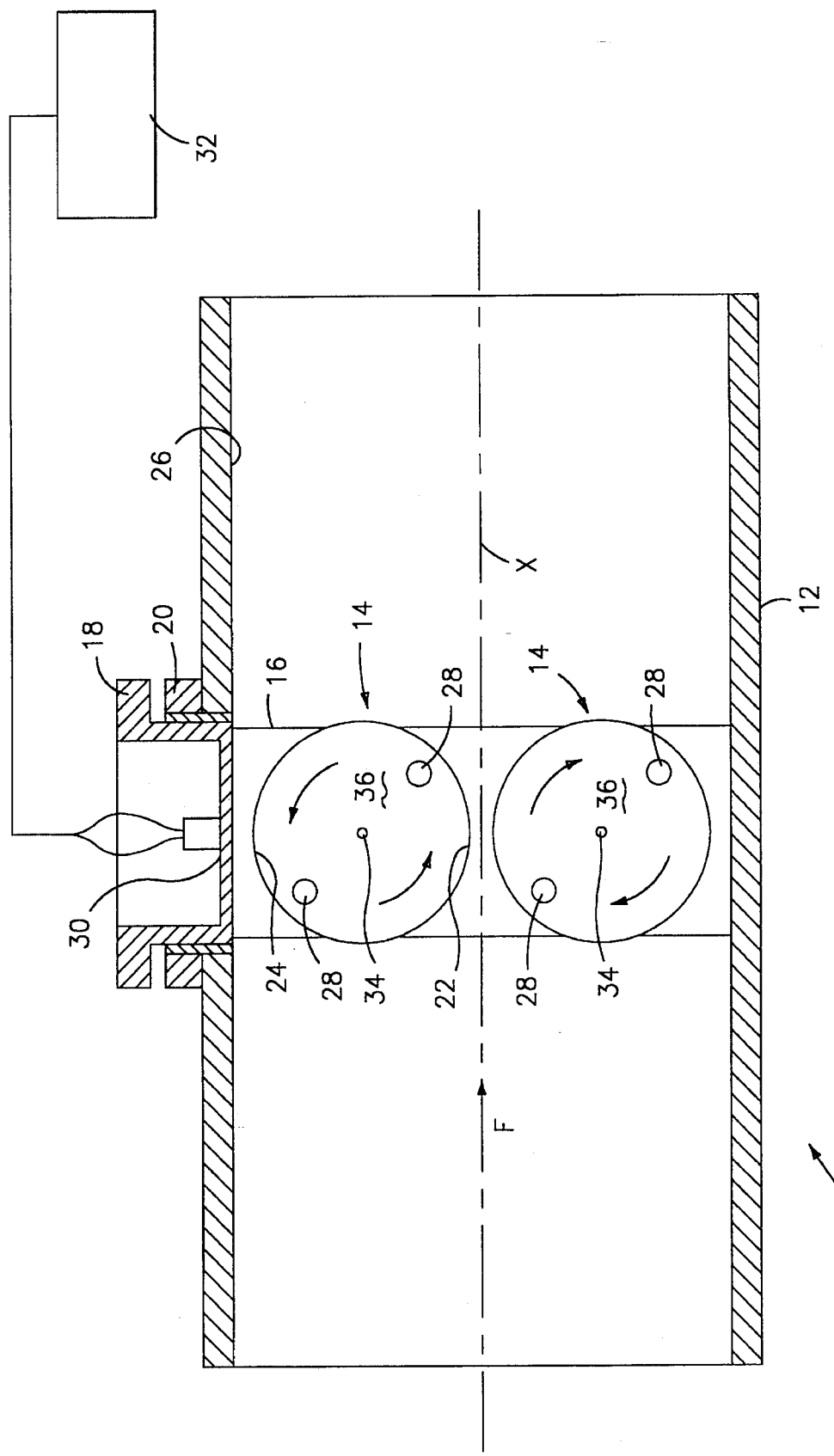
FIG. 1 is a partially schematic cross-section of a measurement system in accordance with the invention.
Figure 1A:
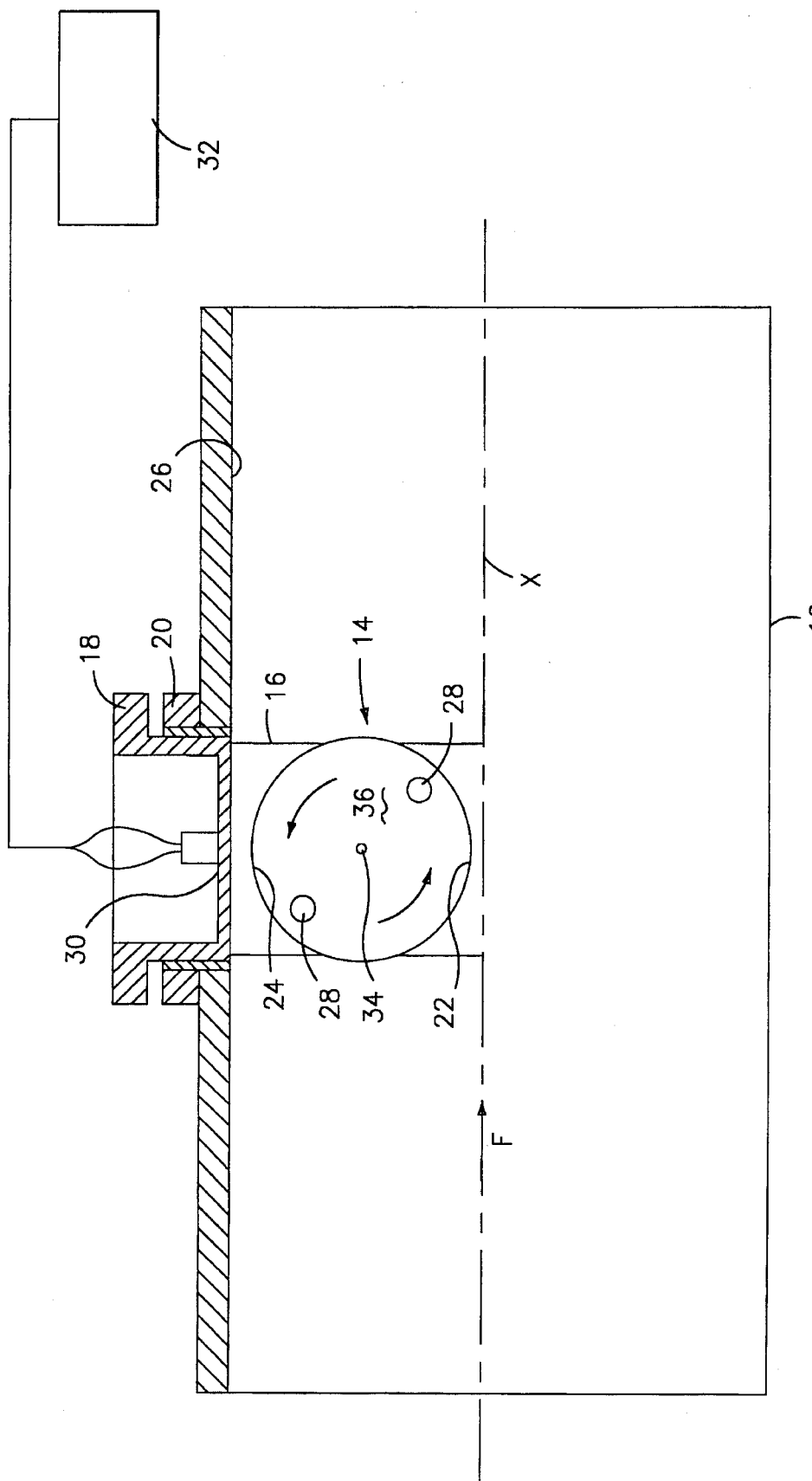

Referring to FIG. 1, a system in accordance with the invention is illustrated and generally referred to by reference numeral 10. In accordance with the invention, system 10 may preferably include a conduit 12 such as any conventional pipeline or other vessel for conveying fluids, and at least one, preferably two rotatable discs 14 rotatably positioned within conduit 12. Discs 14 in accordance with the invention are positioned within conduit 12 in such a manner that fluid flow, represented by arrow F in FIGS. 1 and 3, causes wheel-like rotation of discs 14. In accordance with the invention, the rate of rotation of discs 14 is monitored and translated into a measurement of flow of fluid within conduit 12. As illustrated in FIG. 1, discs 14 may preferably be rotatably mounted on a support member 16 which may be permanently disposed within conduit 12. Support member 16 may alternatively, if desired, be attached to a plug member 18 or any other typical connection mechanism for deployment within conduit 12 at any desired opening or interface 20 which may be disposed thereon.

Discs 14 are preferably positioned within conduit 12 in an edge wise orientation. In other words, discs 14 are positioned for wheel-like rotation around an axle member or axis which is substantially perpendicular to the direction of flow of fluid within conduit 12. In accordance with the invention, as fluid flows by discs 14, drag or shear forces are applied by the flowing fluid to the planar surfaces 36 of discs 14. When flow in conduit 12 is laminar in nature, velocity is highest at the central axis X of conduit 12, and drops off to a minimum value substantially adjacent to the wall 26 of conduit 12. Accordingly, in accordance with the invention, discs 14 are preferably positioned within conduit 12 so as to be substantially, and preferably entirely, to one side of central axis X. In this manner, one edge of each disc 14 will be in close proximity to the wall of conduit 12 while the other edge is in close proximity to central axis X. Thus, velocity of fluid (and the resulting drag force on disc 14) passing by discs 14 will be relatively large at edge 22 which is closest to central axis X of conduit 12 and will be relatively small at edge 24 of disc 14 which is closest to wall 26 of conduit 12. The drag force exerted by the higher velocity of fluid, namely that towards axis X from center point 34, will be greater than the drag force exerted on the other side of disc 14 namely between center point 34 and the wall of conduit 12. Thus, the differential in force over discs 14 results in a rotation of discs 14 which rotation tends to increase with an increase in velocity. In accordance with the invention, the rotational velocity of discs 14 is measured and translated into accurate measurements of a desired flow parameter such as average velocity or mass or volume flow rate. Edgewise positioning of discs 14 also serves advantageously to present the least obstacle or obstruction to flow. Discs 14 in FIG. 1 are shown positioned substantial vertically, namely one above and one below central axis X. It should be noted that discs 14 could be arranged substantially horizontally, or at any other attitude in accordance with the invention, so long as discs 14 are preferably radially aligned with axis X.

In accordance with the invention, positioning of disc 14 in the flow of fluid in conduit 12 induces rotation of disc 14 responsive to drag forces of the flowing fluid. Discs 14 will increase in rotation speed until the relative velocity of fluid compared to disc 14 is the same above and below center point 36. When the relative velocities are equal kinematic rotation of discs 14, results wherein fluctuations in fluid viscosity do not affect the accuracy of the measurement of flow. Thus, advantageously, the flow of a non-Newtonian fluid such as an oil-in-water emulsion is readily measured in accordance with the present invention.

As further illustrated in FIG. 1, discs 14 may be provided with ferrous or magnetic elements 28, and a sensor 30 may be positioned proximate to elements 28 so as to detect element 28 during rotation of discs 14. In accordance with the invention, a electronic control unit 32 is also preferably provided and connected to sensor 30 for monitoring the rate of rotation of discs 14, for example, based upon pulses received from sensor 30 as magnetic or ferrous elements 28 pass thereby. Control unit 32 may preferably be a typical PC or other microprocessor programmed to determine the rate of rotation of discs 14 from the signals received from sensor 30.

Of course, numerous alternative known mechanical and/or electrical means could be utilized in accordance with the invention for measuring the rate of rotation of discs 14.

Control unit 32 may also preferably be programmed to translate the rate of rotation of discs 14 into the desired flow parameter such as average fluid velocity, mass or volume flow rate and the like.

Figure 2:
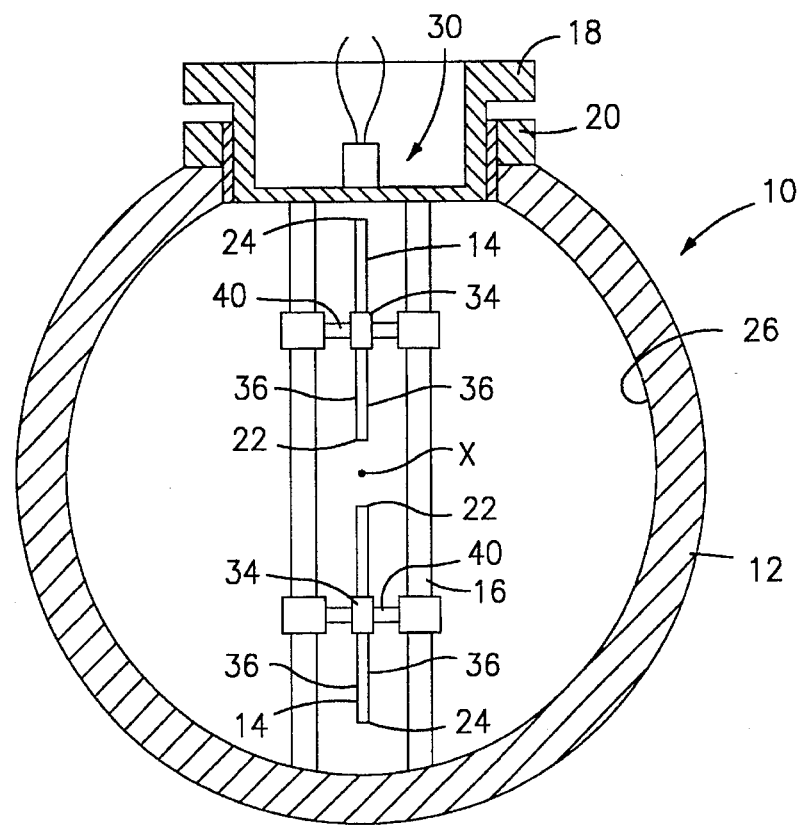
FIG. 2 is a cross-section taken laterally through the conduit of FIG. 1.

As shown in FIGS. 1 and 2, discs 14 are preferably substantially uniform planar members fixed for rotation in the flow of fluid to be measured. Discs 14 in this embodiment are rotatably mounted to support member 16 so as to rotate about a center point 34 of disc 14. Discs 14 are preferably substantially uniform so as to provide a smooth rotation around center point 34. It should be noted that while substantially uniform discs 14 are preferred, any substantially uniform and substantially planar body member having a geometric center could be used in accordance with the invention. Rotatable positioning of such a body member for rotation around the geometric center of the body member serves in accordance with the invention to provide an indication which is proportional to the average velocity of the fluid of interest.

It is noted that one disc would provide a sufficient measurement of rotation which could be utilized for determining a flow parameter of fluid in conduit 12. However, it is preferable to provide two discs 14, preferably positioned in equi-distant and opposed relationship to central axis X of conduit 12, so as to avoid preferential flow in conduit 12 away from one disc. The rate of rotation of both discs need not be monitored in such an embodiment. Rather, it is sufficient to monitor the rotation of any one disc 14, and a disc 14 whose rotation is not to be monitored of course need not be equipped with elements 28. However, in cases where the flow pattern is not symmetrical to the axis of the pipe, the average rate of rotation of the two discs 14 gives a flow measure which is more accurate.

Figure 3:
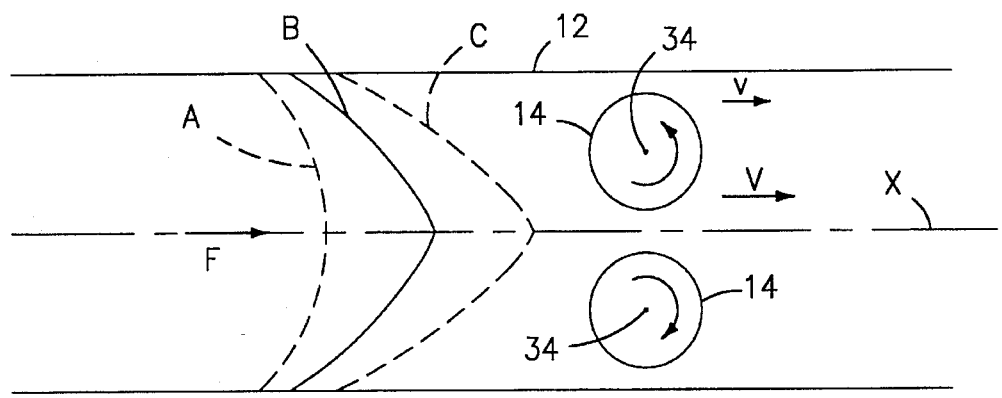
FIG. 3 is a schematic illustration of a laminar flow in a conduit and the resulting differential force applied to a disc member positioned therein for rotation in accordance with the invention.

Referring to FIG. 3, the principle of operation of the present invention is further explained. FIG. 3 schematically illustrates conduit 12 and three velocity profiles A, B, C of a laminar flow of fluid flowing in the direction of arrow F. Profiles A, B, C illustrate profiles for laminar flows having increasing velocities, with profile C representing the highest velocity. As shown, velocity is highest at the central line or central axis X of conduit 12 and is smallest adjacent to the wall of conduit 12 for each profile. As the velocity of fluid increases, the velocity at the center line increases concurrently, while the velocity adjacent to the wall of conduit 12 remains substantially small. Thus, as velocity increases, the differential in drag force applied to discs 14 also increases, thereby increasing the rate of rotation of discs 14. The rotating discs 14 of the present invention serve to integrate the velocity profile of the flowing fluid and thereby provide a more accurate measurement of the desired fluid flow parameter.

As best illustrated in FIGS. 1 and 2, discs 14 are preferably located along radii of conduit 12. Further, it has been found that best accuracy is achieved by positioning discs 14 so that edge 22 is as close to central axis X as possible without crossing central axis X, and so that edge 24 is positioned as close as possible to wall 26 of conduit 12 without causing frictional losses. Thus, discs 14 preferably have a diameter which is slightly less than the radius of conduit 12. In this regard, the drag force exerted upon discs 14 may be viewed as having two components, one resulting from fluid passing above center point 34 and one resulting from fluid passing below center point 34. On the upper most disc 14 illustrated in FIG. 1, the resultant force applied below center point 34 (and closest to axis X) will be greater than the resultant force applied above center point 34. The differential in force causes rotation of discs 14. As the flow rate of fluid increases, the drag force differential also increases, so that discs 14 rotate more rapidly as fluid flows more rapidly.

Figure 4:
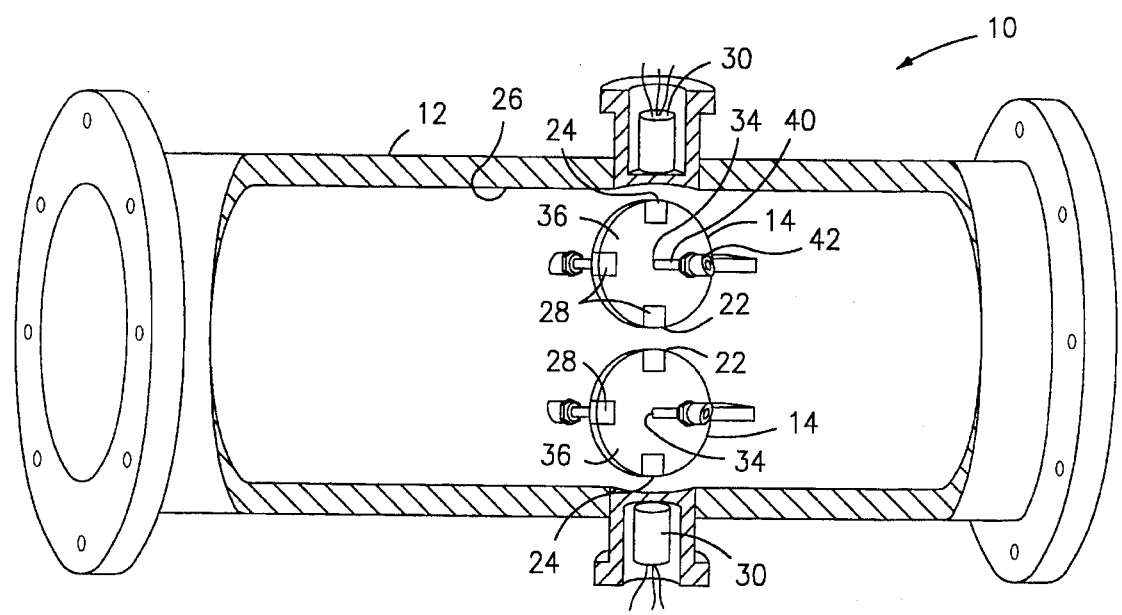
FIG. 4 is a perspective partially sectional view of an embodiment of a system for measuring flow in accordance with the invention.
Figure 5:
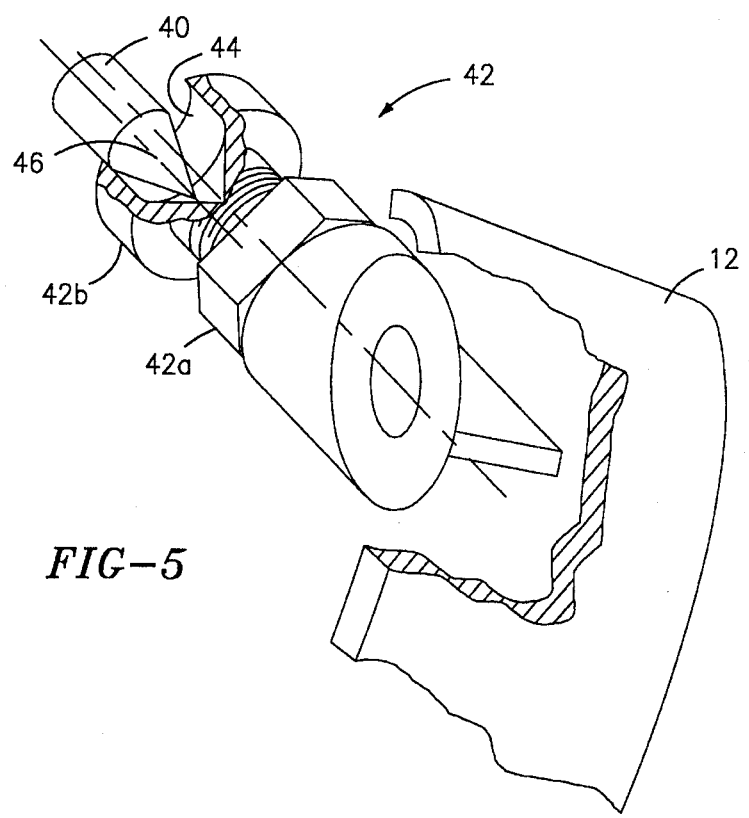
FIG. 5 is an enlarged, perspective and partially sectional view of a portion of the system of FIG. 4.

FIGS. 4 and 5 illustrate an alternative embodiment of the invention wherein discs 14 are mounted on axles 40. Axles 40 are rotatably held within sleeves 42 attached to the inside surface of conduit 12. According to the invention, and as shown particularly in FIG. 5, sleeves 42 preferably open into the inner space of conduit 12 so that the fluid flowing therein serves to lubricate axle 40 rotating in sleeve 42.

Sleeve 42 according to this embodiment preferably includes a fixed portion 42a mounted to the wall of conduit 12 by any suitable means such as welding, and an adjustable portion 42b which may be threadedly mounted to fixed portion 42a as shown. Adjustable portion 42b may be threaded relative to fixed portion 42a so as to adjust for the proper length of axle 40 and further to provide a desired amount of clearance for axle 40.

As shown, adjustable portion 42b may suitably have a substantially conically shaped opening 44 as shown, and axle 40 may be tapered to a pointed end 46 also as shown to provide for smooth rotation and lubrication of axle 40.

Figure 6:
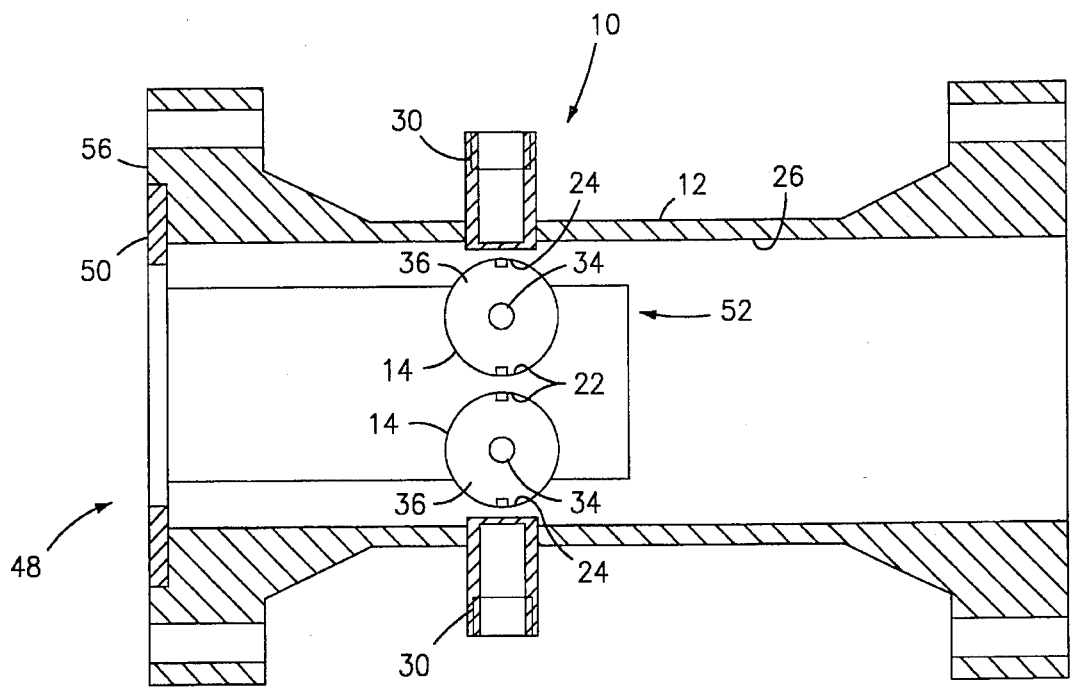
FIG. 6 is an elevational sectional view of another alternate embodiment of the invention.
Figure 7:
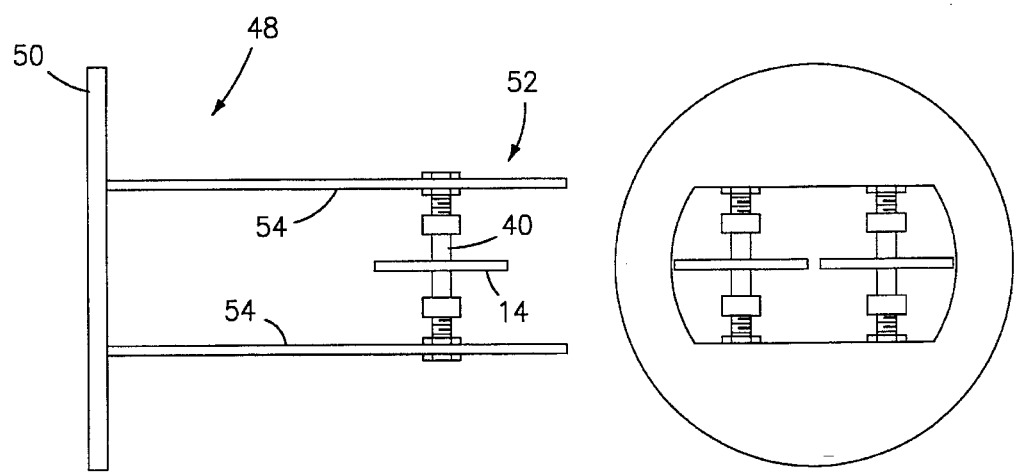
FIG. 7 is a top plan view of the insert member of the embodiment illustrated in FIG. 6.
Figure 8:
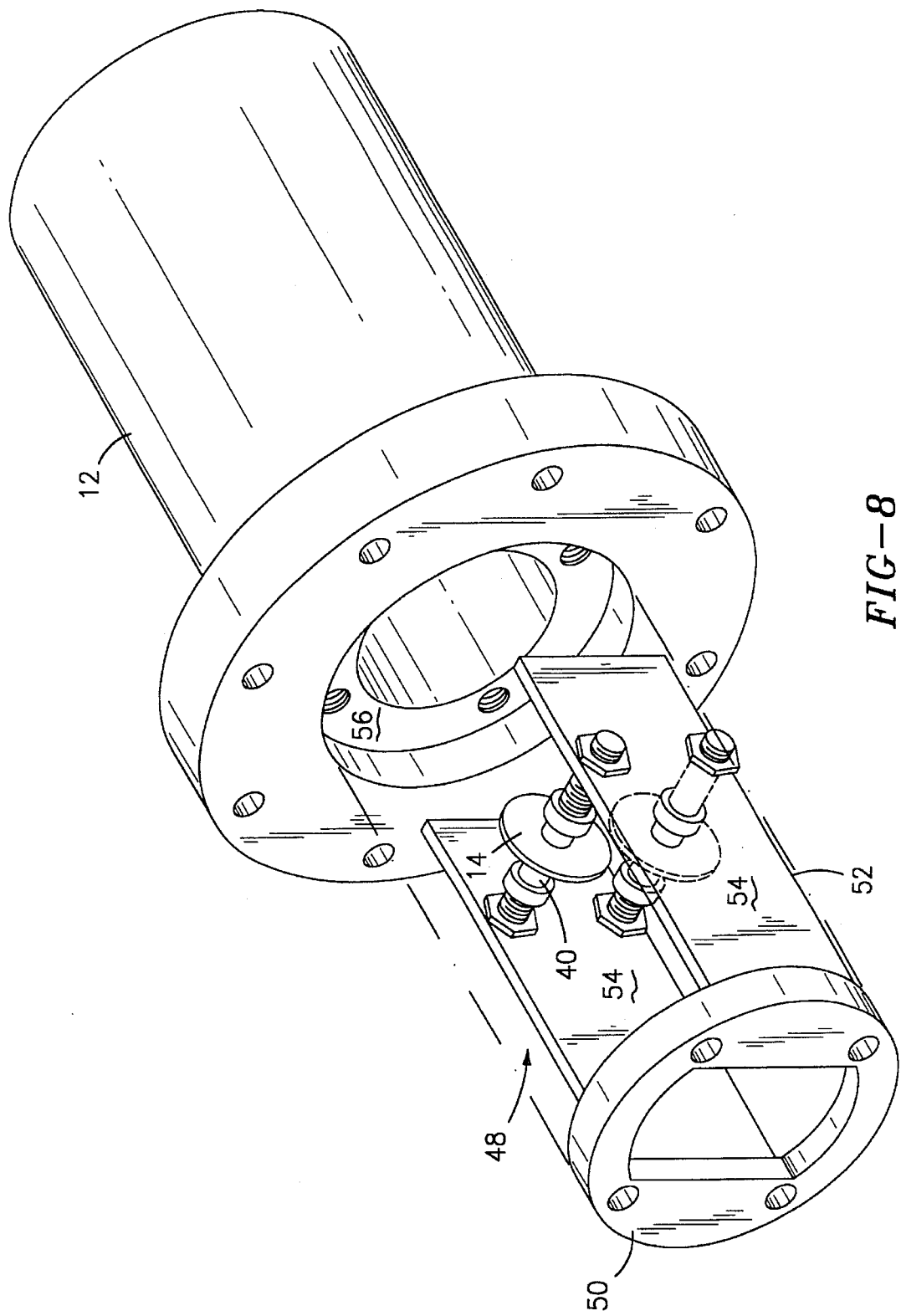
FIG. 8 is a perspective view of the embodiment shown in FIG. 6.

Referring now to FIGS. 6, 7 and 8, a further alternative embodiment is illustrated which is particularly suited for use with small diameter conduits 12 wherein it may not be practical to weld sleeves or other structure within conduit 12 to hold axle 40 in place. As shown in FIGS. 6 and 7, discs 14 may be mounted on an insert member 48 having a flange portion 50 and a sleeve member 52 extending from said flange portion. As best shown in FIG. 7, discs 14 according to this embodiment are fixed to axles 40 which are rotatably mounted between arms 54 of sleeve member 52. Flange 50 extends radially from sleeve member 52 so as to provide a surface for mounting between end surfaces 56 of adjacent sections of conduit 12. In accordance with this embodiment of the invention, the need for welding of structure for holding axles 40 within conduit 12 is avoided thereby advantageously reducing interference with flow through conduit 12.

In accordance with the foregoing, it should be noted that system 10 in accordance with the invention provides accurate measurements of flow of fluid in conduit 12 when the flow of such fluid is laminar in nature. With typical oil-in-water emulsions and conduits 12 as presently in use, laminar flow is provided so long as the Reynolds number is maintained less than or equal to about 3,000, and preferably less than or equal to about 2,000. Above this Reynolds number, flow may become turbulent and adversely impact upon the accuracy of system 10 for measuring flow of fluid.

A primary advantage of the invention is recognized in providing measurement of flow of non-Newtonian or very viscous oil-in-water emulsions which are not measurable with conventional devices.

It should be noted, however, that the present invention would of course find wide application in measuring other fluids as well including both Newtonian and non-Newtonian fluids. In this regard, although the present invention is intended specifically for fluids which are non-Newtonian in nature, system 10 could of course be used to measure velocity of Newtonian fluids as well, provided the flow of such fluid is laminar in nature.

System 10 in accordance with the invention is operative to measure a difference in drag force which the flowing fluid exerts upon discs 14 at various different distances from central axis X, which difference in force causes rotation of disc 14. The rotation is proportional to the flow of fluid through conduit 12. By monitoring the rate of rotation, the fluid flow rate or other flow parameter may readily be determined.

This invention may be embodied in other forms or carried out in other ways without departing from the spirit or essential characteristics thereof. The present embodiments are therefore to be considered as in all respects to be illustrative and not restrictive, the scope of the invention being indicated by the appended claims, and all changes which come within the meaning and range of equivalency are intended to be embraced therein.

What is claimed is:

1. A system for measuring a flow parameter of a fluid, comprising:
   a conduit defining a flow passage for said fluid, said flow passage having a central axis;
   means located in said flow passage for sensing a differential between a first resultant drag force exerted by said fluid at a first distance from said central axis and a second resultant drag force exerted by said fluid at a second distance from said central axis different from said first distance; and
   means for determining said flow parameter from said sensed differential, whereby said flow parameter is accurately measured regardless of viscosity changes in said fluid.

2. A system according to claim 1, wherein said means for sensing comprises a substantially planar body member having a center point and being located in and parallel to said flow passage so that said body member has a first area and a second area divided by an axis drawn through said center point parallel to said central axis, wherein said first resultant drag is exerted on said first area and said second resultant drag is exerted on said second area.

3. A system according to claim 2, wherein said body member is rotatably located in said flow passage whereby said differential between said first drag force and said second drag force causes rotation of said body member around said center point.

4. A system according to claim 3, including means for measuring the rotation speed of said body member, and wherein said means for determining said flow parameter determines said flow parameter based upon said rotation speed.

5. A system according to claim 4, wherein said body member is radially positioned with respect to said central axis.

6. A system according to claim 2, wherein said body member comprises a substantially uniform disc rotatably positioned within said conduit so that said differential force exerted by said flow of fluid causes rotation of said disc.

7. A system according to claim 6, wherein said conduit is substantially tubular and has a radius, and wherein said disc has a diameter which is less than said radius.

8. A system according to claim 6, wherein said disc is positioned for wheel-like rotation around said center point.

9. A system according to claim 6, wherein said disc is positioned in a plane which includes said central axis of said conduit.

10. A system according to claim 6, wherein said means for sensing has two substantially uniform discs positioned in said plane on opposite sides of said central axis of said conduit, whereby preferential flow away from one of said two discs is prevented.

11. A system according to claim 10, wherein said two discs are positioned on opposite sides of and substantially equidistant from said axis of said conduit.

12. A system according to claim 10, wherein said conduit is substantially tubular and has a radius, and wherein each of said two discs has a diameter which is less than said radius.

13. A system according to claim 10, including means for measuring a rotation speed of at least one of said two discs.

14. A system according to claim 1, wherein said fluid is an oil in water emulsion.

15. A system according to claim 1, wherein said fluid flowing in said conduit exhibits a Reynolds number of less than or equal to about 3000.

16. A system according to claim 4, wherein said means for measuring determines average fluid velocity from said rotation speed.

17. A system according to claim 6, wherein said disc is mounted on an axle, and wherein said axle is mounted in sleeves which open into said flow passage whereby said fluid lubricates said axle.

18. A system according to claim 4, wherein said means for measuring said rotation speed comprises indicator means on said body member and means for counting revolutions of the indicator means over time positioned on said conduit.

19. A system according to claim 4, further comprising an insert member arranged within said conduit, said means for measuring being mounted on said insert member.

20. A system according to claim 19, wherein said insert member has a flange portion positioned between sections of said conduit, and two arm members extending into said conduit, and wherein said means for measuring is mounted between said sleeve members.

21. A system for measuring a flow parameter of a fluid, comprising:

a conduit defining a flow passage for said fluid, said flow passage having a central axis;

at least one disc member having a circumferential surface and a center point and being rotatably mounted in said flow passage for rotation in one of the first or second segments around said center point, said disc member being positioned within said conduit to one side of the central axis such that a portion of the circumferential surface of said disc is in close proximity to the conduit while another portion of the circumferential surface of said disc is in close proximity to the central axis, whereby said fluid causes said disc member to rotate at a rate of rotation; and means for determining said flow parameter from said rate of rotation of said disc member, whereby said flow parameter is accurately measured regardless of viscosity changes in said fluid.

22. A method for measuring a flow parameter of a fluid flowing in a conduit defining a flow passage having a central axis, comprising the steps of:

rotatably positioning a disc member having a circumferential surface in said flow passage within said conduit to one side of the central axis such that a portion of the circumferential surface of said disc is in close proximity to the conduit while another portion of the circumferential surface of said disc is in close proximity to the central axis, whereby said fluid causes said body member to rotate at a rate of rotation;

measuring said rate of rotation; and correlating said rate of rotation to said flow parameter.

* * * * *